(12) United States Patent
Wang

(10) Patent No.: US 6,936,980 B2
(45) Date of Patent: Aug. 30, 2005

(54) WHEEL RIM DEVICE WITH PATTERNED LIGHT CAPABLE OF AUTOMATICALLY GENERATING ELECTRIC POWER

(75) Inventor: Chu-Li Wang, Tainan (TW)

(73) Assignee: Chu-Tong Wang, Tainan (TW)

( * ) Notice: Subject to any disclaimer, the term of this patent is extended or adjusted under 35 U.S.C. 154(b) by 32 days.

(21) Appl. No.: 10/760,420

(22) Filed: Jan. 21, 2004

(65) Prior Publication Data

US 2005/0156538 A1    Jul. 21, 2005

(51) Int. Cl.[7] .............................................. G05F 1/00
(52) U.S. Cl. ...................... 315/292; 315/362; 362/500; 362/806; 40/587; 301/37.108; 301/37.109; 301/37.25; 301/37.29
(58) Field of Search ................ 315/77, 169.3, 315/312, 292, 362; 362/800, 806, 500, 545; 40/587; 345/48, 42, 44, 46; 301/37.29, 37.25, 301/37.108, 37.109, 37.101, 44.4

(56) References Cited

U.S. PATENT DOCUMENTS 6,265,984 B1 *   7/2001   Molinaroli ............... 340/815.4
6,340,868 B1 *   1/2002   Lys et al. ................. 315/185 S
6,565,243 B1 *   5/2003   Cheung ....................... 362/500
6,749,321 B2 *   6/2004   Luo ............................ 362/192

* cited by examiner

*Primary Examiner*—Haissa Philogene
(74) *Attorney, Agent, or Firm*—Rosenberg, Klein & Lee

(57) ABSTRACT

A wheel rim device with patterned light capable of automatically generating electric power has a wheel rim, an automatic generating assembly, a rectifier/filter circuit, a circuit board, a programmable chip and several light emitting components. The automatic generating assembly is accommodated on an end face of a wheel axle of the wheel rim. The circuit board is disposed on a wheel spoke of the wheel rim. The rectifier/filter circuit, the programmable chip and the light emitting components are disposed on the circuit board. Input terminals of the rectifier/filter circuit are connected to lead out wires of the automatic generating assembly. The programmable chip has a power source terminal, a trigger terminal and several I/O terminals. The power source terminal is connected with the output terminal of the rectifier/filter circuit. Each of the I/O terminals is connected with one of the light emitting components.

16 Claims, 14 Drawing Sheets

WHEEL RIM DEVICE WITH PATTERNED LIGHT CAPABLE OF AUTOMATICALLY GENERATING ELECTRIC POWER

FIELD OF THE INVENTION

The present invention relates to a wheel rim device with patterned light capable of automatically generating electric power and, more particularly, to a device capable of controlling light emitting components disposed at a wheel rim to generate various glittering and jumping dynamic variations for accomplishing the effect of persistence of vision and also displaying different mixed color lights.

BACKGROUND OF THE INVENTION

In a conventional lighting structure disposed in a car wheel rim, a battery holder is arranged in the center of a wheel rim cover, a battery cover is installed on the battery holder, and a circuit board is installed in the battery holder. A light sensor is installed at the center of the outer side of the wheel rim cover. The light sensor is connected to the circuit board. A plurality of light emitting components is installed in symmetric positions on the periphery of the wheel rim cover. A centrifugal switch is also installed at the edge of the inner side of the wheel rim cover. When a car runs at a certain speed, the centrifugal switch is turned on. When night falls, the light sensor completes the circuit to let the light emitting components on the wheel rim cover emit light.

Although the above light emitting structure has a light emitting function, if the battery on the battery holder runs out of power, the light emitting components won't work, and the light sensor also loses its function.

If the wheel rim has a mechanism for automatically generating electric power, the above situation won't occur. Moreover, the order and dynamic light variations of the light emitting components can be controlled through circuit design for accomplishing the effect of persistence of vision and displaying different mixed color lights.

SUMMARY OF THE INVENTION

An object of the present invention is to provide a car wheel rim with a mechanism for automatically generating electric power. Moreover, light emitting components arranged on the mechanism can be controlled through special circuit design to generate various dynamic light variations for accomplishing the effect of persistence of vision and displaying different mixed color lights.

To achieve the above object, the present invention proposes a wheel rim device with patterned light capable of automatically generating electric power. The wheel rim device comprises a wheel rim, an automatic generating assembly, a rectifier/filter circuit, a circuit board a programmable chip and several light emitting components. Wheel spokes and a wheel axle are disposed on the wheel rim. An accommodating room is concavely disposed on an end face of the wheel axle. The automatic generating assembly is accommodated in the accommodating room of the wheel rim, and can generate an AC voltage when the wheel rim rotates. The circuit board is disposed on one of the wheel spokes of the wheel rim. A plurality of one light emitting components is disposed on the circuit board. The rectifier/filter circuit is disposed on the circuit board, and is connected to the automatic generating assembly to rectify and filter the AC voltage generated by the automatic generating assembly to obtain a stable DC voltage. The programmable chip is disposed on the circuit board connected to the rectifier/filter circuit and the light emitting components. The programmable chip is used to drive the light emitting components to generate various glittering and jumping dynamic variations at different times and in different orders for accomplishing the effect of persistence of vision according to different timings of the output waveform of the programmable chip when the automatic generating assembly generates the AC voltage and the rectifier/filter circuit rectify and filter the AC voltage to obtain the DC voltage. Besides, the color mixing effect can also be accomplished between the light emitting components to display different color lights.

The programmable chip is formed by integrating an oscillator, a frequency selector, a ROM, a counter, a pattern memory and a buffer into a single chip microcontroller.

The programmable chip has a power source terminal, a trigger terminal and several I/O terminals. The power source terminal is connected to an output terminal of the rectifier/filter circuit. End each of the I/O terminals is connected with one of the light emitting components.

The automatic generating assembly, the rectifier/filter circuit, and the circuit board also apply to a wheel rim having a wheel rim cover.

Lead-out wires of the automatic generating assembly can also be connected to several light emitting components.

BRIEF DESCRIPTION OF THE DRAWINGS

The various objects and advantages of the present invention will be more readily understood from the following detailed description when read in conjunction with the appended drawings, in which.

DETAILED DESCRIPTION OF THE PREFERRED EMBODIMENTS

Figure 1:
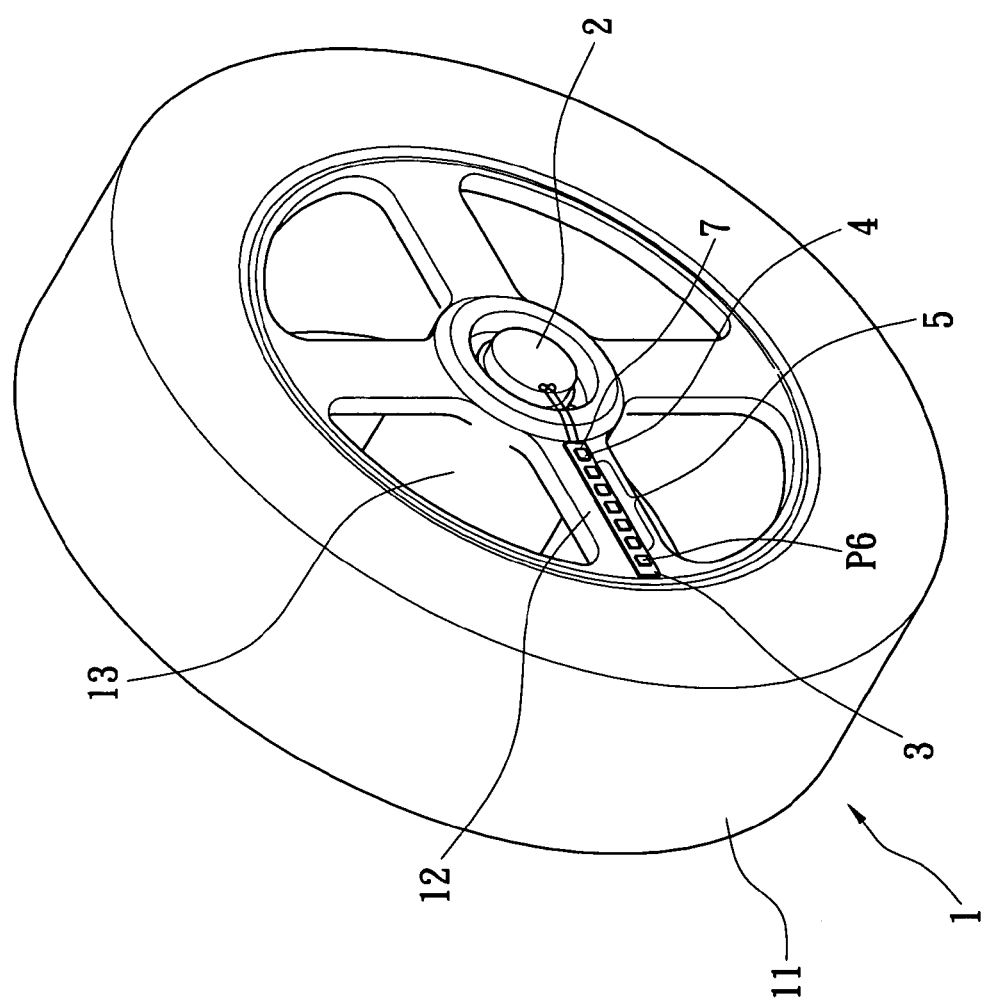
FIG. 1 is a perspective view of a first embodiment of the present invention.
Figure 2:
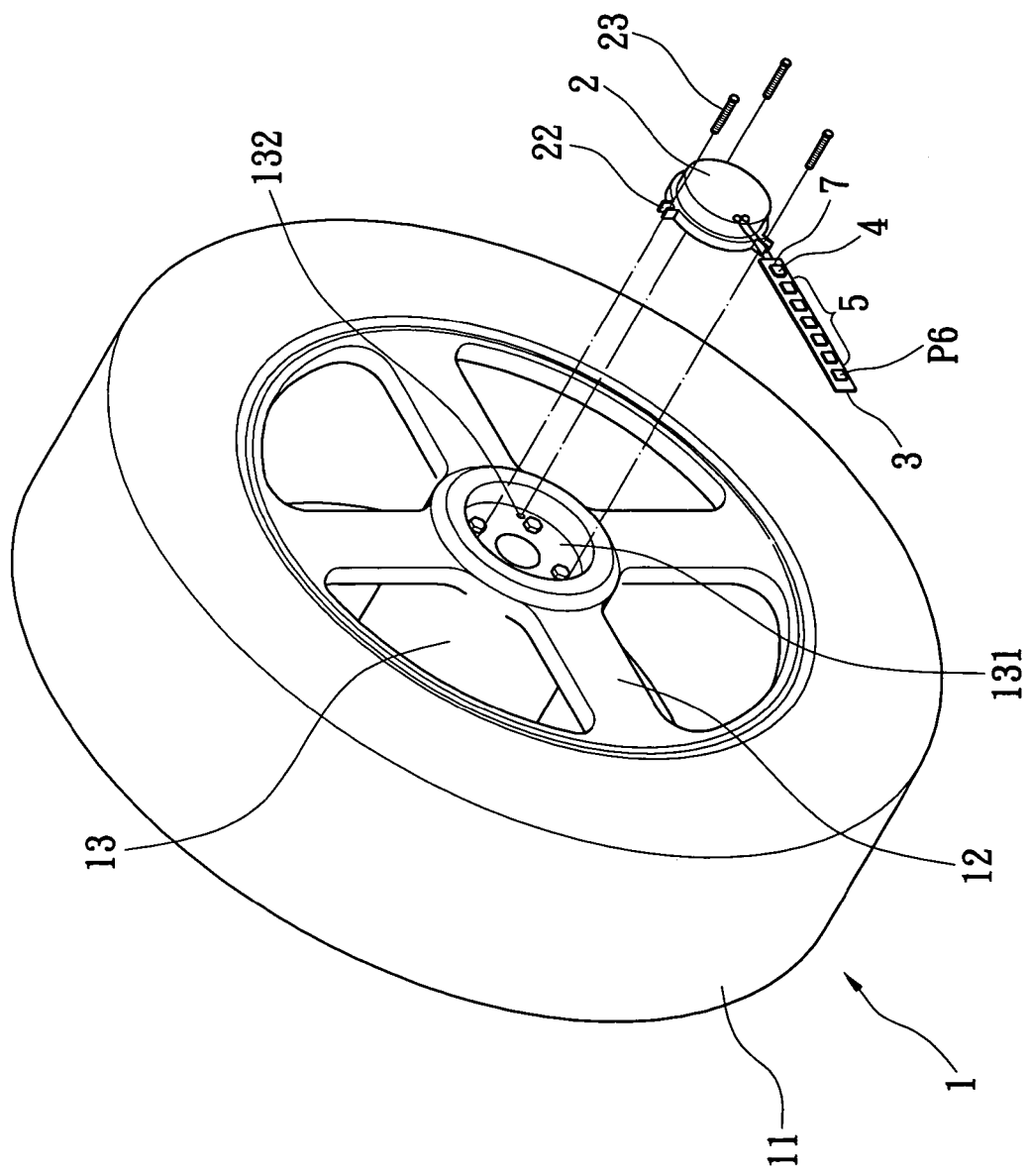
FIG. 2 is an exploded perspective view of FIG. 1.
Figure 3:
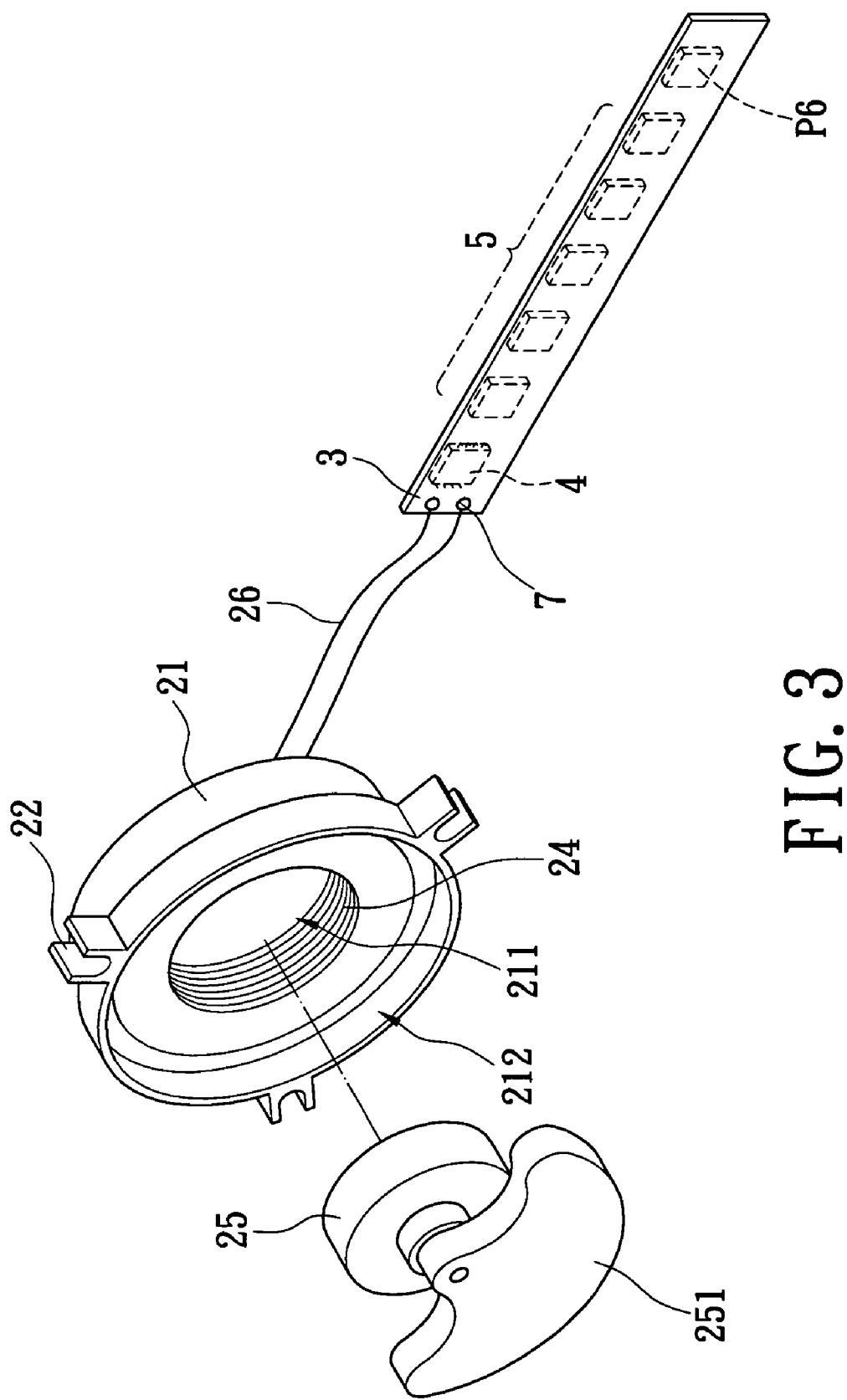
FIG. 3 is an exploded perspective view showing the connection between an automatic generating assembly and a circuit board of the present invention.
Figure 4:
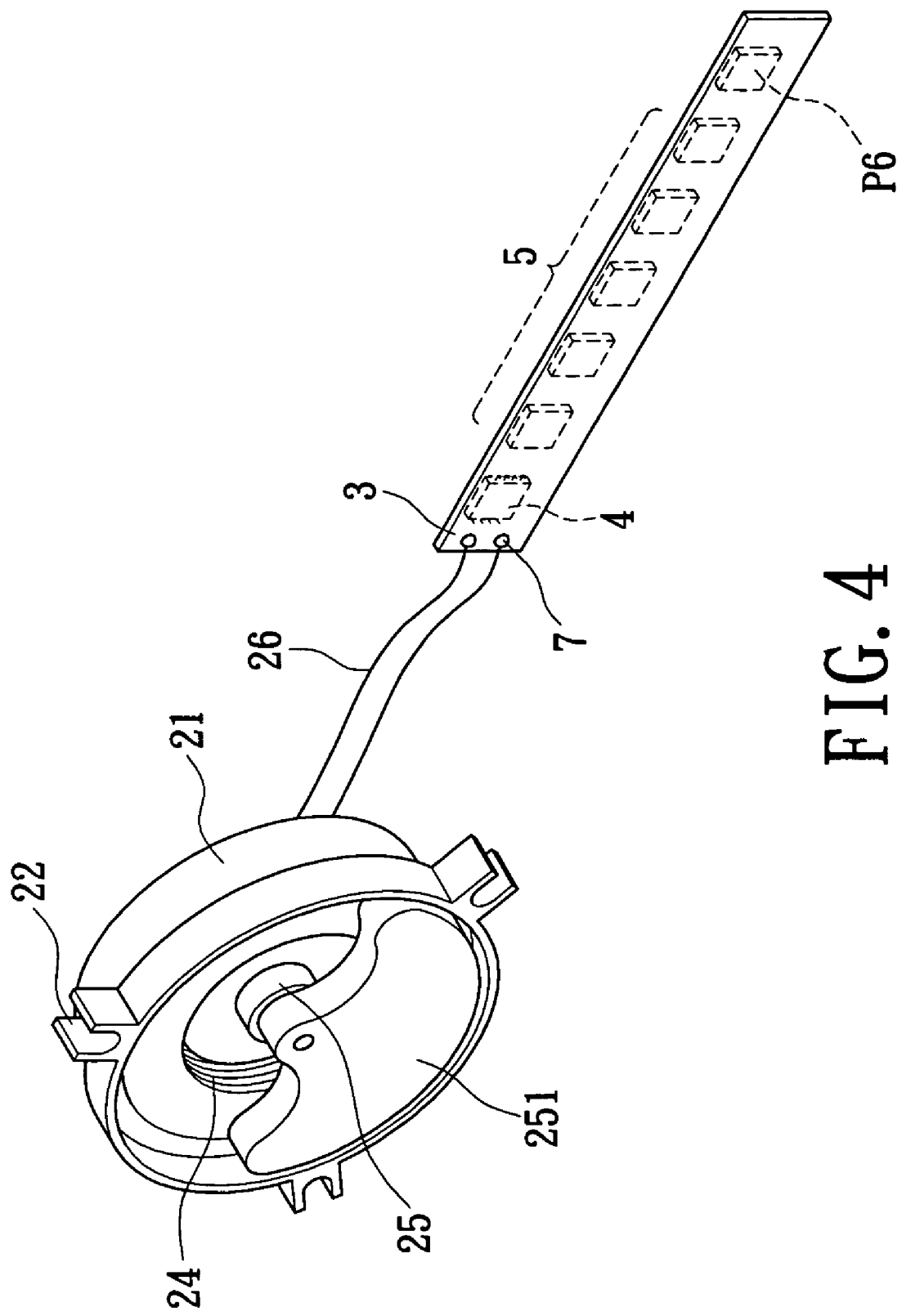
FIG. 4 is an assembly view of FIG. 3.
Figure 5:
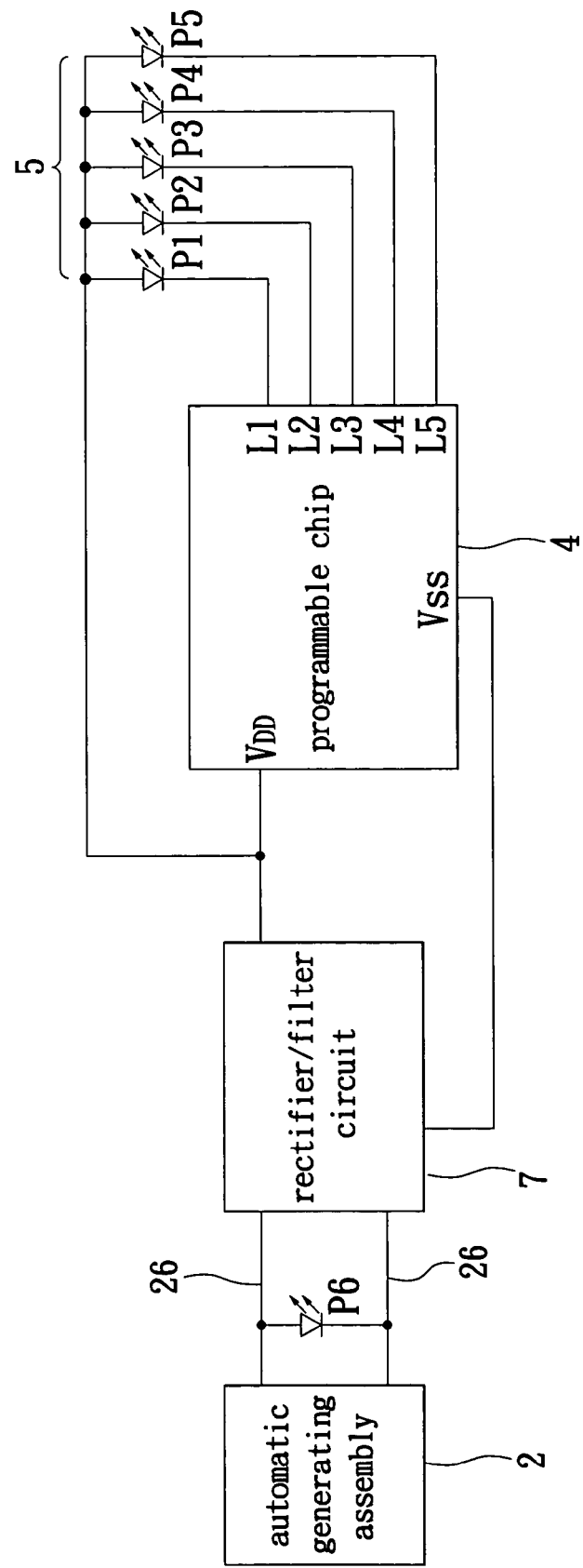
FIG. 5 is a circuit block diagram of the present invention.
Figure 6:
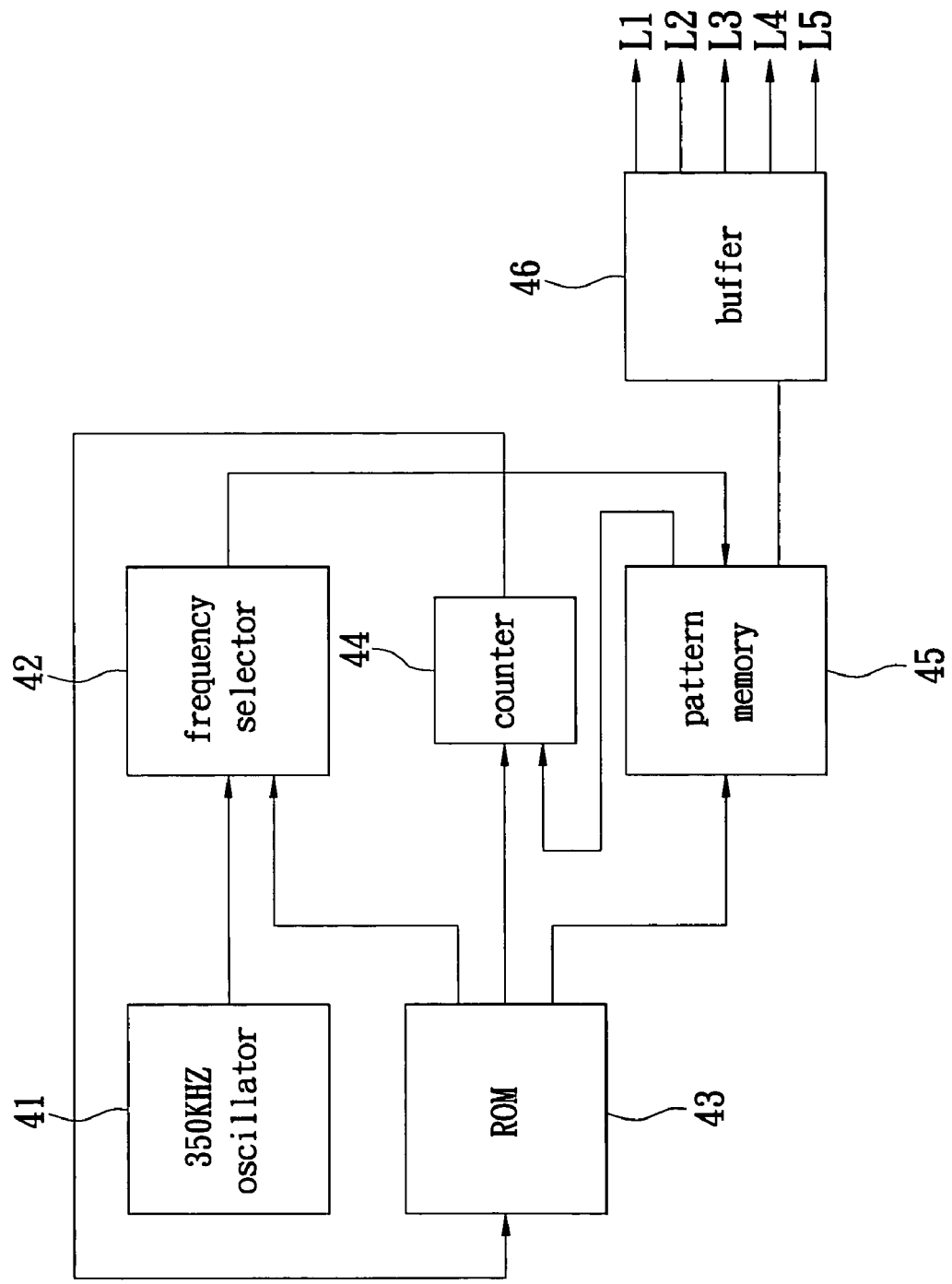
FIG. 6 is an inner block diagram of a programmable chip of the present invention.

As shown in FIGS. 1 to 6, a wheel rim device with patterned light capable of automatically generating electric power of the present invention comprises a wheel rim 1, a rectifier/filter circuit 7, an automatic generating assembly 2, a circuit board 3, a programmable chip 4 and several light emitting components 5.

The wheel rim 1 is an aluminum alloy wheel rim, and is composed of a main body 11, wheel spokes 12 and a wheel axle 13. An accommodating room 131 is concavely disposed on an end face of the wheel axle. A plurality of holes 132 is formed on an inner face of the accommodating room 131.

The automatic generating assembly 2 is connected in the accommodating room 131 of the wheel rim 1, and has a shell cover 21 having a closed face. Positioning components 22 are annularly disposed on an outer periphery face of the shell cover 21. Several screwing components pass through the positioning components to be firmly screwed to the holes of the wheel axle. Two cavities 22 and 23 are disposed on an inner face of the shell cover 21. The first cavity 22 is smaller than the second cavity 23. An inducting coil 24 is annularly disposed in the first cavity 22. A magnetic component 25 is also disposed in the first cavity 22. Lead-out wires 26 are extended from two distal ends of the induction coil 24 and pass through the closed face. A heavy hammer 251 is pivotally disposed at the axle center portion of the magnetic component 25. The heavy hammer 251 will always remain in the vertical direction during motion. The heavy hammer 251 is disposed on an inner periphery face of the second cavity 23.

The rectify/filter circuit 7 is connected with the lead-out wires of the automatic generating assembly 2, and is composed of a bridge rectifier and a filter capacitor. The rectifier/filter circuit 7 is used to rectify and filter an AC voltage generated by the automatic generating assembly to obtain a DC voltage.

In this embodiment, the circuit board 3 is connected on the wheel spoke 12 of the wheel rim 1. The circuit board 3 has several light emitting components 5 thereon. In this embodiment, there are six light emitting components P1–P6 of different colors. Each light emitting component is a light emitting diode (LED). One light emitting component (P6) is a blue LED, and is connected with the lead-out wires 26 of the automatic generating assembly 2.

The programmable chip 4 is disposed on the circuit board 3, and is connected with the output terminal of the rectifier/filter circuit 7 and the light emitting components P1-P5. The programmable chip 4 is formed by integrating a 350 kHz oscillator 41, a frequency selector 42, a ROM 43, a counter 44, a pattern memory 45 and a buffer 46 into a single chip microcontroller. The programmable chip 4 has power source terminals VDD and VSS and several I/O terminals L1–L5. The I/O terminals L1–L5 are connected with the light emitting diodes P1–P5, respectively. The light emitting components 5 will generate various glittering and jumping dynamic variations at different times and in different orders for accomplishing the effect of persistence of vision according to different timings of the output waveform of the programmable chip when the programmable chip functions. Besides, the color mixing effect can also be accomplished between the light emitting components to display different color lights.

Figure 7B:
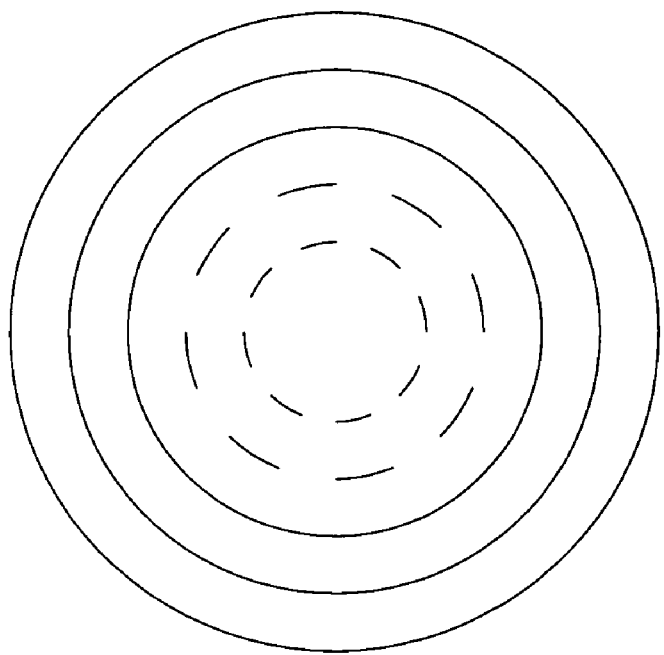
FIG. 7B is a pattern variation diagram showing the effect of persistence of vision according to the timing of FIG. 7A.

When the wheel rim 1 rotates to let the induction coil 24 generate an inducted electromotive force, the light emitting diode P6 will be on, and the induction coil 24 will also provide power to the rectifier/filter circuit 7 to output an DC power to the programmable chip 4, thereby driving the light emitting diodes P1–P5. Meanwhile, the light emitting diodes P1–P5 will generate various glittering and jumping dynamic variations (FIGS. 7B, 8B and 9B) at different times and in different orders for accomplishing the effect of persistence of vision according to different timings of the output waveform (FIGS. 7A, 8A and 9A) of the programmable chip. Besides, the color mixing effect can also be accomplished between the light emitting components to display different color lights.

Figure 7A:
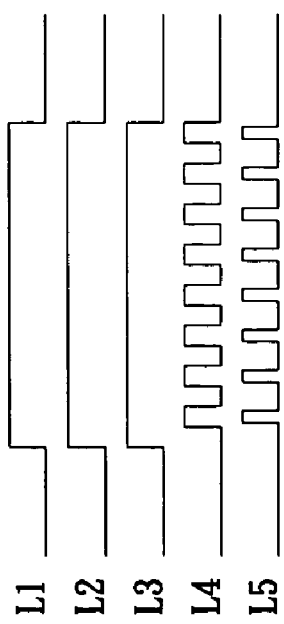
FIG. 7A is a timing diagram showing different frequencies output to light emitting components by a programmable chip of the present invention.
Figure 8B:
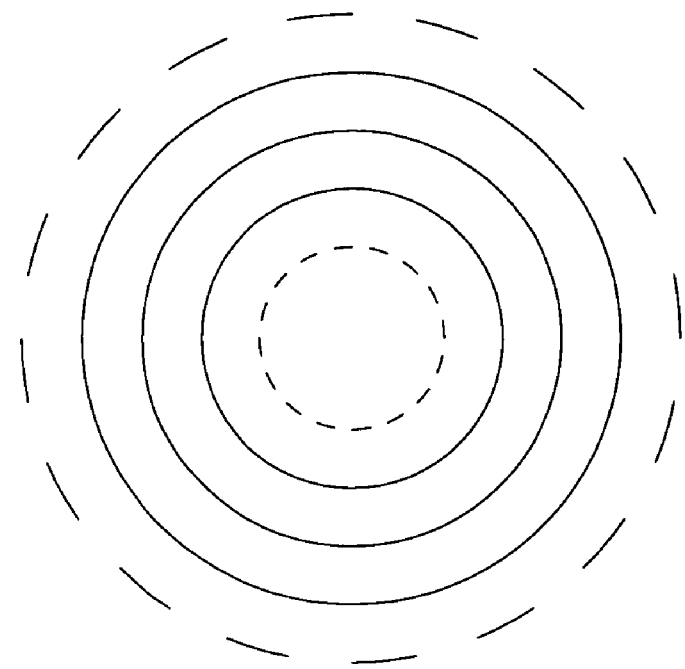
FIG. 8B is a pattern variation diagram showing the effect of persistence of vision according to the timing of FIG. 8A.

Reference is made to FIG. 7A. The first to third light emitting diodes P1–P3 are driven by the programmable chip 4 to be on all the time, while the fourth and fifth light emitting diodes P4 and P5 are driven by the programmable chip 4 to be on and off at different rates. When the wheel rim 1 rotates, the pattern shown in FIG. 7B will be obtained.

Figure 8A:
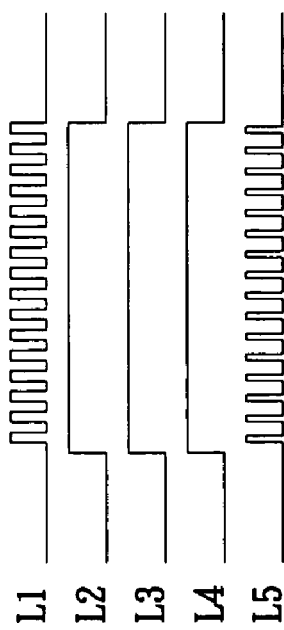
FIG. 8A is another timing diagram showing different frequencies output to light emitting components by a programmable chip of the present invention.
Figure 9B:
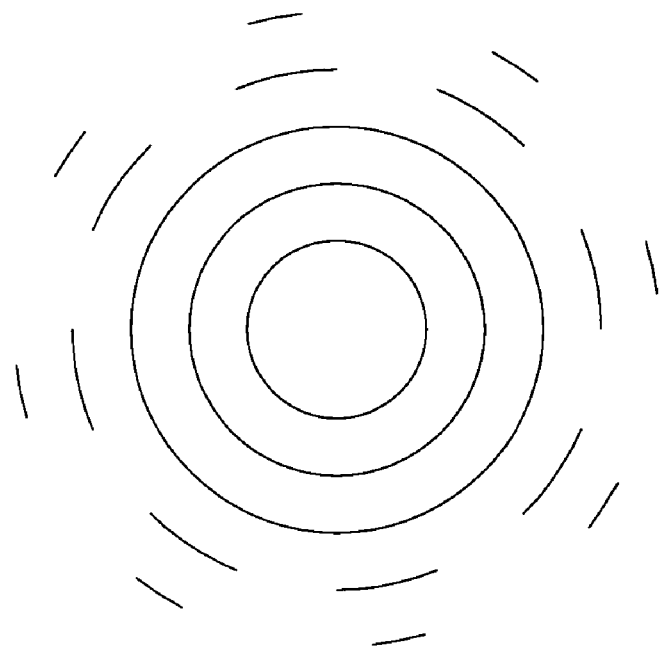
FIG. 9B is a pattern variation diagram showing the effect of persistence of vision according to the timing of FIG. 9A.

Reference is made to FIG. 8A. The second to the fourth light emitting diodes P2–P4 are driven by the programmable chip 4 to be on all the time, while the first and fifth light emitting diodes P1 and P5 are driven by the programmable chip 4 to be on and off at different rates. When the wheel rim 1 rotates, the pattern shown in FIG. 8B will be obtained.

Figure 9A:
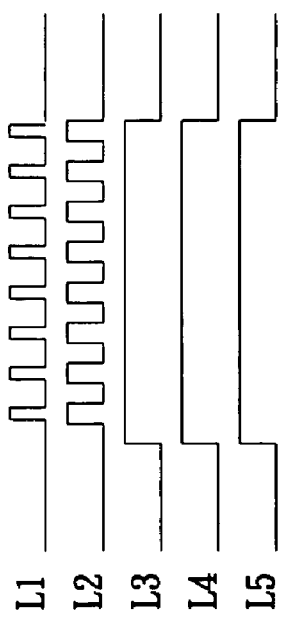
FIG. 9A is yet another timing diagram showing different frequencies output to light emitting components by a programmable chip of the present invention.

Reference is made to FIG. 9A. The third to the fifth light emitting diodes P3–P5 are driven by the programmable chip 4 to be on all the time, while the first and second light emitting diodes P1 and P2 are driven by the programmable chip 4 to be on and off at different rates. When the wheel rim 1 rotates, the pattern shown in FIG. 9B will be obtained.

Figure 10:
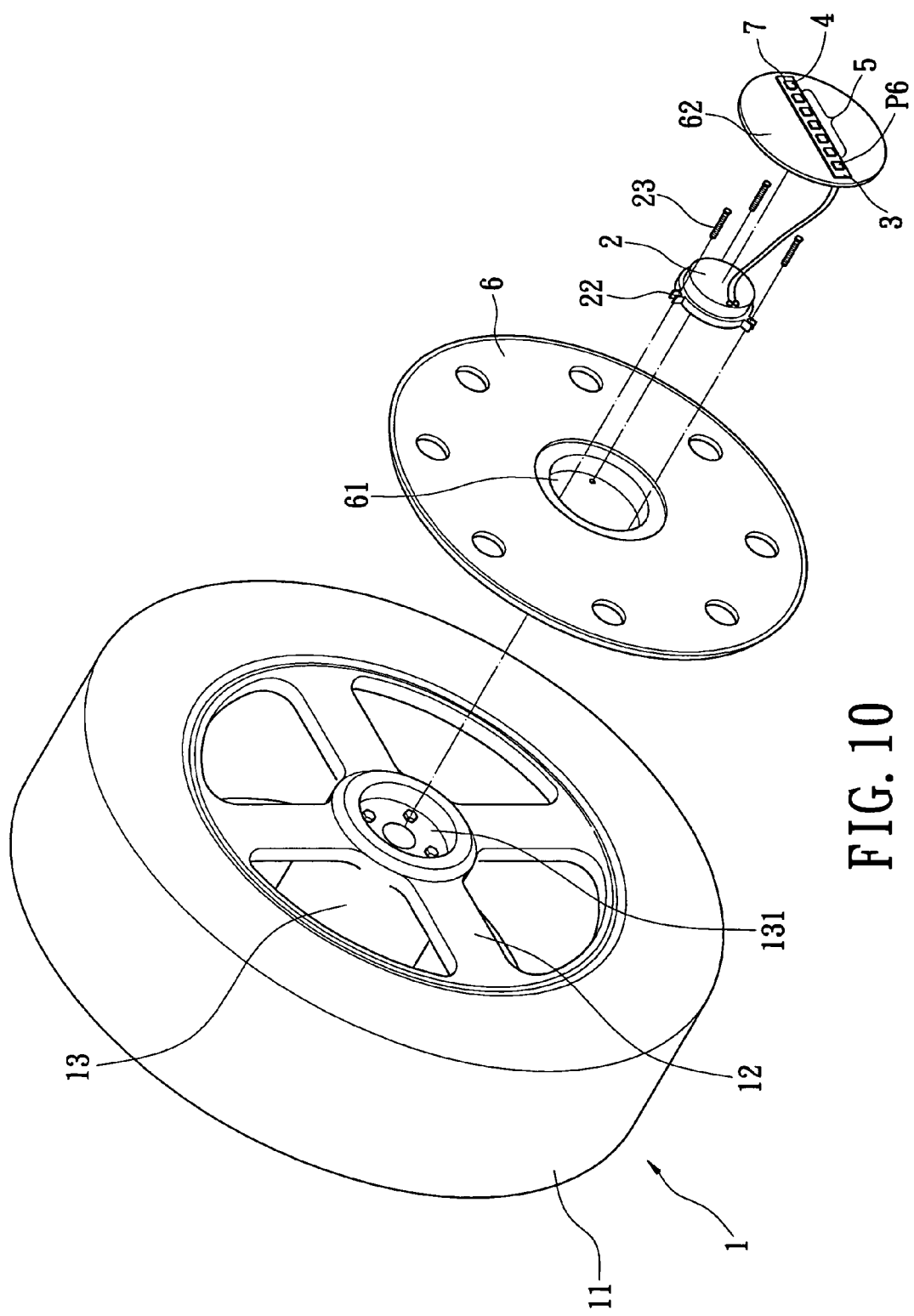
FIG. 10 is an exploded perspective view of a second embodiment of the present invention.
Figure 11:
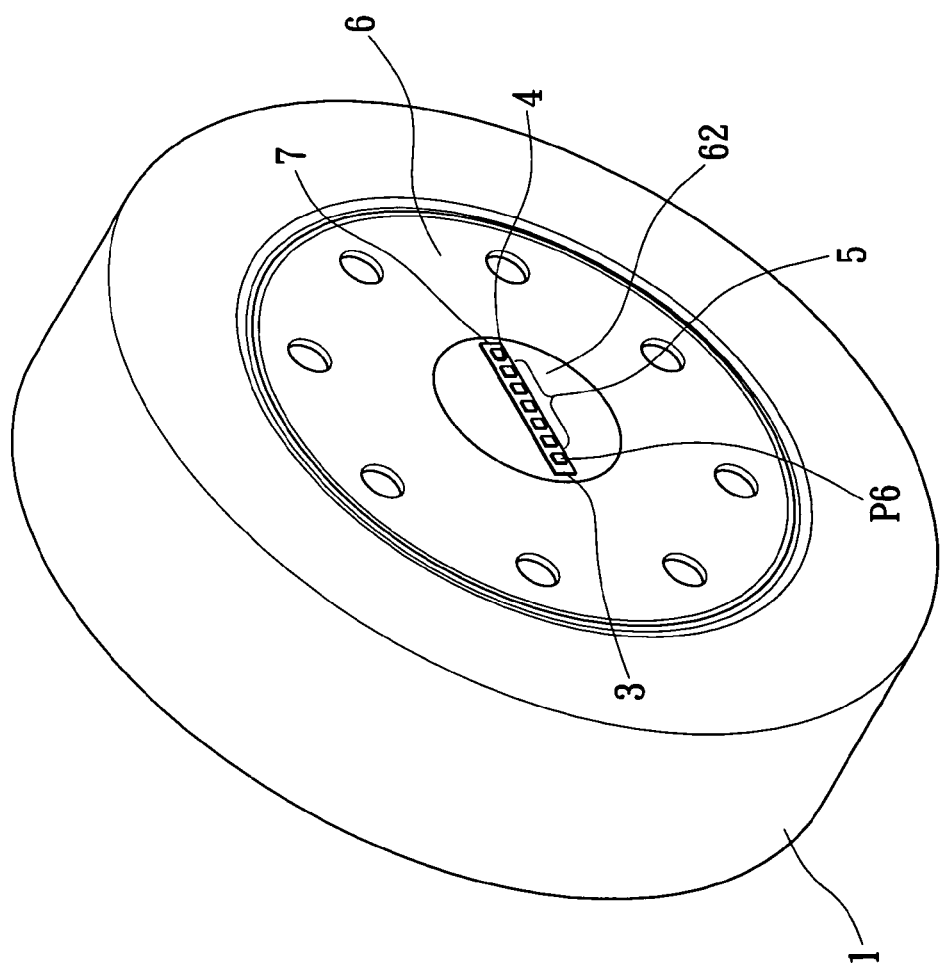
FIG. 11 is an assembly view of FIG. 10.

Reference is made to FIGS. 10 and 11. The automatic generating assembly 2, the rectifier/filter circuit 7, the circuit board 3, the control unit 4 and the light emitting components 5 of the present invention can also apply to a wheel rim 1 having a wheel rim cover 6. The wheel rim cover 6 is connected at an opening portion of the main body of the wheel rim 1. An accommodating space 61 is concavely formed at the center portion of the wheel rim cover 6. The automatic generating assembly 2 and a cover board 62 are connected in the accommodating space 61 in order. Screwing components 23 are used to firmly lock the automatic generating assembly 2 with the wheel rim cover 6. The circuit board 3 is connected on the surface of the cover board 62 of the wheel rim cover 6.

When the wheel rim 1 rotates, the induction coil 24 will generate an inducted electromotive force to let the light emitting diode P6 be on and also provide power for the rectifier/filter circuit 7 to output a DC power to the programmable chip 4 for driving the light emitting components P1–P5. The light emitting components 5 will generate various glittering and jumping dynamic variations at different times and in different orders for accomplishing the effect of persistence of vision according to different timings of the output waveform of the programmable chip 4. Besides, the color mixing effect can also be accomplished between the light emitting components 5 to display different color lights.

Figure 12:
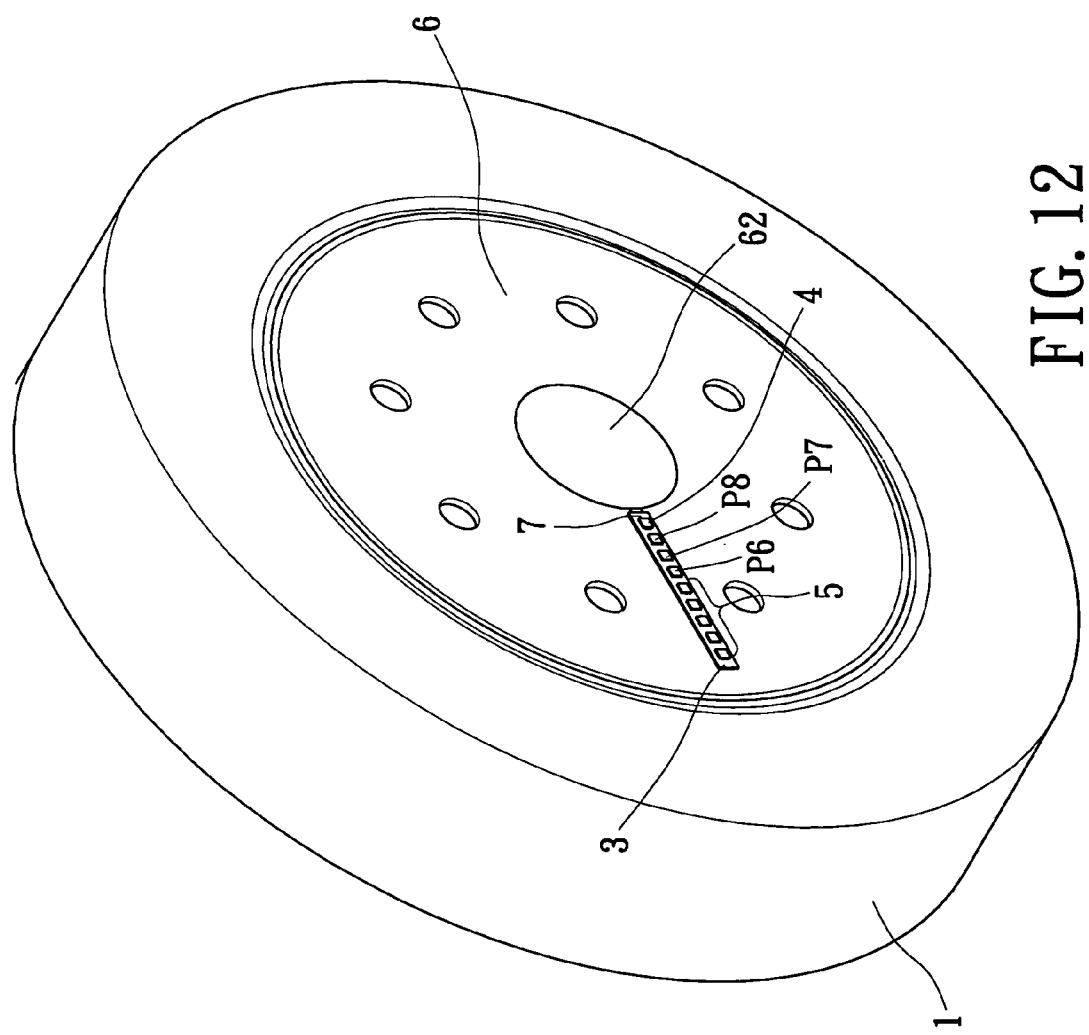
FIG. 12 is a perspective view of a third embodiment of the present invention.

As shown in FIG. 12, the light emitting components 5 and the light emitting diode P6 can also be assembled on the wheel rim cover 6.

Figure 13:
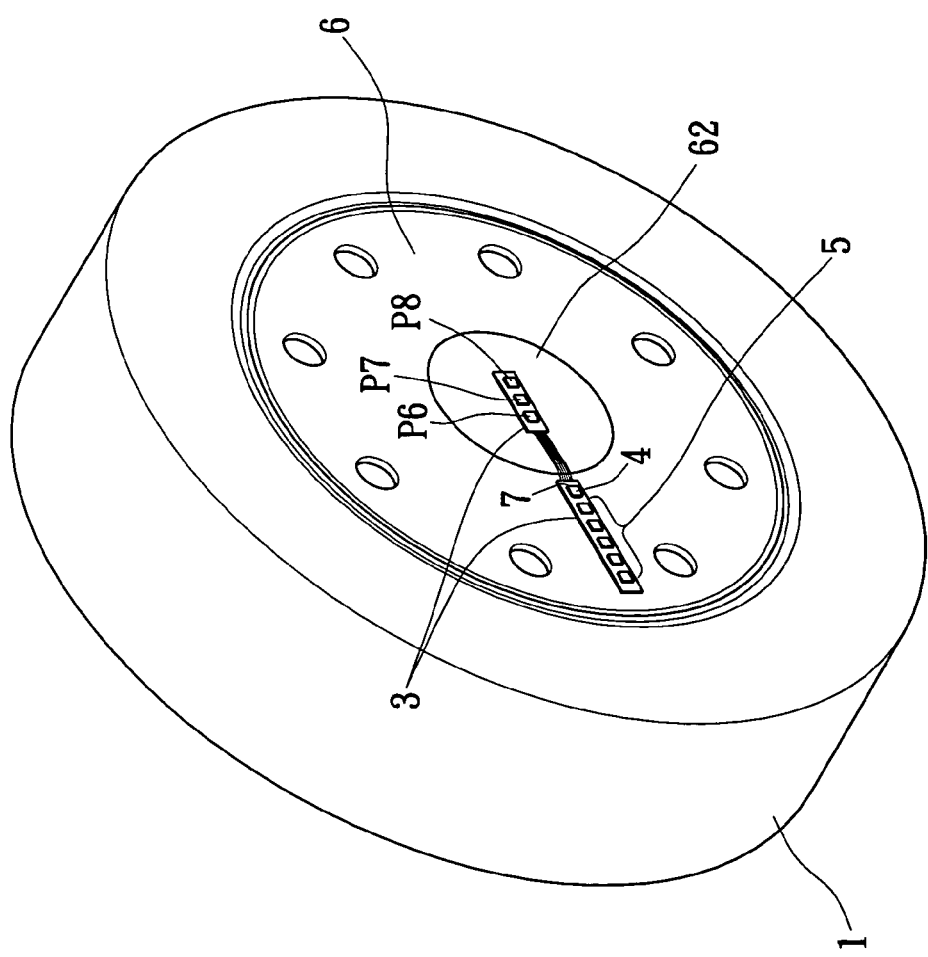
FIG. 13 is a perspective view of a fourth embodiment of the present invention.
Figure 14:
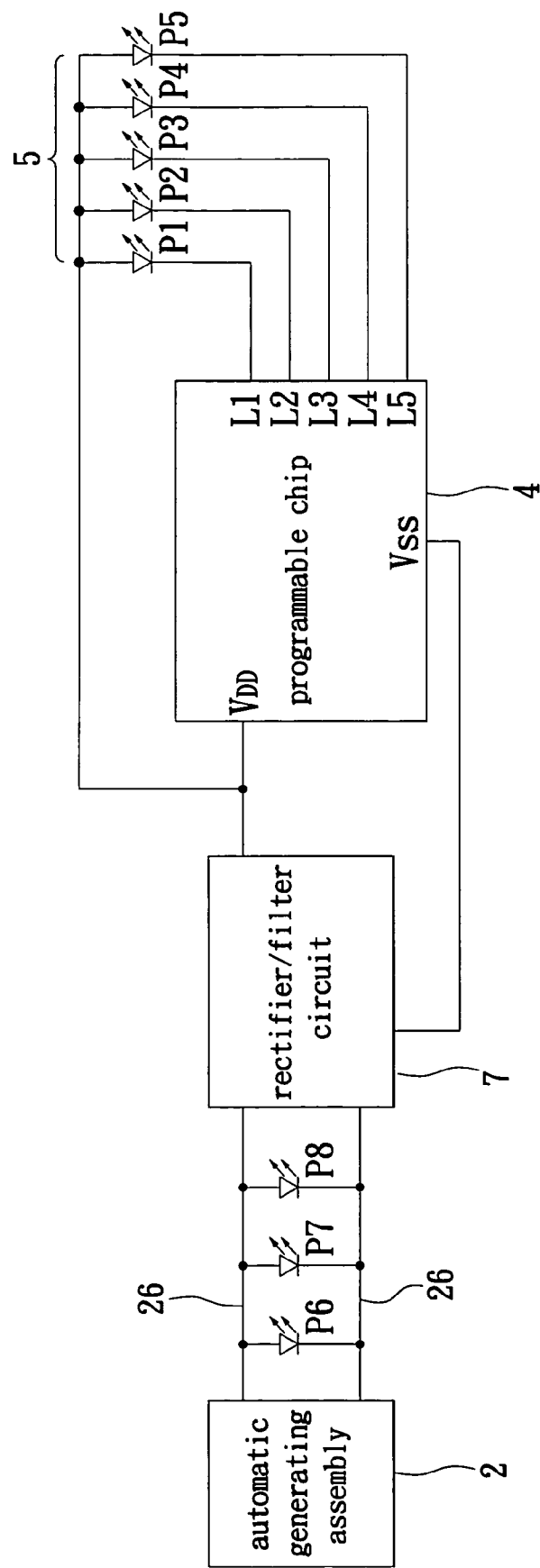
FIG. 14 is a circuit block diagram according to the fourth embodiment of the present invention.

As shown in FIGS. 13 and 14, several light emitting diodes P1–P8 can be assembled on the wheel rim cover 6 and the cover board 62 to add more variations. The light emitting diodes P1–P5 are connected to the I/O terminals L1–L5 of the programmable chip 4, while the light emitting diodes P6–P8 are connected to the lead-out wires 26 of the automatic generating assembly 2.

When the wheel rim 1 rotates, the induction coil 24 will generate an inducted electromotive force to let the light emitting diodes P6–P8 be on and also provide power for the rectifier/filter circuit 7 to output a DC power to the programmable chip 4 for driving the light emitting components P1–P5. The light emitting components 5 will generate various glittering and jumping dynamic variations at different times and in different orders for accomplishing the effect of persistence of vision according to different timings of the output waveform of the programmable chip 4. Besides, the color mixing effect can also be accomplished between the light emitting components 5 to display different color lights.

To sum up, through the novel structure and circuit design of the present invention, the light emitting components assembled on the wheel rim can be controlled to generate various glittering and jumping dynamic variations for accomplishing the effect of persistence of vision. Besides, the color mixing effect can also be accomplished to display different color lights.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. A wheel rim device with patterned light capable of automatically generating electric power, the wheel rim device comprising:
    a wheel rim with wheel spokes and a wheel axle disposed thereon, an accommodating room being concavely provided on an end face of said wheel axle;
    an automatic generating assembly arranged in said accommodating room of said wheel rim for generating an AC voltage when said wheel rim rotates;
    a rectifier/filter circuit connected with said automatic generating assembly to rectify and filter the AC voltage generated by said automatic generating assembly to obtain a DC voltage;
    a circuit board connected on one said wheel spoke of said wheel rim and having a plurality of light emitting components; and
    a programmable chip disposed on said circuit board and connected with said rectifier/filter circuit and said light emitting components, said programmable chip being used to drive said light emitting components to generate various glittering and jumping dynamic variations for accomplishing the effect of persistence of vision according to different timings of the output waveform of said programmable chip when said rectifier/filter circuit outputs a DC voltage, a color mixing effect being also accomplished between said light emitting components to display different color lights.

2. The wheel rim device as claimed in claim 1, wherein said programmable chip is formed by integrating an oscillator, a frequency selector, a ROM, a counter, a pattern memory and a buffer into a single chip microcontroller.

3. The wheel rim device as claimed in claim 2, wherein said programmable chip has a power source terminal, a trigger terminal and several I/O terminals, said power source terminal is connected to an output terminal of said rectifier/filter circuit, and each of said I/O terminals is connected with one of said light emitting components.

4. The wheel rim device as claimed in claim 1, wherein said automatic generating assembly is connected with one or more light emitting components.

5. The wheel rim device as claimed in claim 1, wherein said automatic generating assembly has a shell cover having a closed face, a first cavity and a second cavity are provided on an inner face of said shell cover, said first cavity is smaller than said second cavity, an induction coil is annularly disposed in said first cavity, a magnetic component is also assembled in said first cavity, a heavy hammer is pivotally disposed at an axle portion of said magnetic component, said heavy hammer is always maintained in a vertical direction due to gravity, said heavy hammer is disposed on an inner periphery face of said second cavity, lead-out wires are extended from two distal ends of said induction coil and connected to said rectifier/filter circuit, and said induction coil generates an induced electromotive force when said wheel rim rotates.

6. The wheel rim device as claimed in claim 1, wherein several holes are annularly disposed on an inner face of said accommodating room of said wheel rim.

7. The wheel rim device as claimed in claim 1, wherein positioning components are annularly disposed on an outer periphery face of said shell cover of said automatic generating assembly, and several screwing components pass through said positioning components to be firmly screwed to said holes of said wheel axle.

8. The wheel rim device as claimed in claim 1, wherein said rectifier/filter circuit is disposed on said circuit board.

9. A wheel rim device with patterned light capable of automatically generating electric power comprising:
    a wheel rim having a wheel rim cover, an accommodating room being concavely provided in said wheel rim cover;
    an automatic generating assembly arranged in said accommodating room of said wheel rim cover for generating an AC voltage when said wheel rim rotates;
    a rectifier/filter circuit connected with said automatic generating assembly to rectify and filter the AC voltage generated by said automatic generating assembly to obtain a DC voltage;
    a cover plate connected with said accommodating room of said wheel rim cover;
    a circuit board connected on said wheel rim cover and having more than one light emitting component; and
    a programmable chip disposed on said circuit board and connected with said rectifier/filter circuit and said light emitting components, said programmable chip being used to drive said light emitting components to generate various glittering and jumping dynamic variations for accomplishing the effect of persistence of vision according to different timings of the output waveform of said programmable chip when said rectifier/filter circuit outputs a DC voltage, a color mixing effect being also accomplished between said light emitting components to display different color lights.

10. The wheel rim device as claimed in claim 9, wherein said programmable chip is formed by integrating an oscillator, a frequency selector, a ROM, a counter, a pattern memory and a buffer into a single chip microcontroller.

11. The wheel rim device as claimed in claim 10, wherein said programmable chip has a power source terminal, a trigger terminal and several I/O terminals, said power source terminal is connected to an output terminal of said rectifier/ filter circuit, and each of said I/O terminals is connected with one of said light emitting components.

12. The wheel rim device as claimed in claim 9, wherein said automatic generating assembly is connected with one or more light emitting components.

13. The wheel rim device as claimed in claim 9, wherein said light emitting components are assembled on said wheel rim cover.

14. The wheel rim device as claimed in claim 9, wherein said light emitting components are assembled on both said wheel rim cover and said cover plate.

15. The wheel rim device as claimed in claim 9, wherein said automatic generating assembly has a shell cover having a closed face, a first cavity and a second cavity are provided on an inner face of said shell cover, said first cavity is smaller than said second cavity, an induction coil is annularly disposed in said first cavity, a magnetic component is also assembled in said first cavity, a heavy hammer is pivotally disposed at an axle portion of said magnetic component, said heavy hammer is always maintained in a vertical direction due to gravity, said heavy hammer is disposed on an inner periphery face of said second cavity, lead-out wires are extended from two distal ends of said induction coil and connected to said rectifier/filter circuit, and said induction coil generates an induced electromotive force when said wheel rim rotates.

16. The wheel rim device as claimed in claim 9, wherein positioning components are annularly disposed on an outer periphery face of said shell cover of said automatic generating assembly, and several screwing components pass through said positioning components to be firmly screwed to said wheel rim cover.

* * * * *